(12) United States Patent
Vandervort

(10) Patent No.: US 9,758,262 B2
(45) Date of Patent: Sep. 12, 2017

(54) VENTED LAUNCH VEHICLE ADAPTOR FOR A MANNED SPACECRAFT WITH "PUSHER" LAUNCH ABORT SYSTEM

(71) Applicant: THE BOEING COMPANY, Chicago, IL (US)

(72) Inventor: Robert E. Vandervort, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 321 days.

(21) Appl. No.: 14/338,040

(22) Filed: Jul. 22, 2014

(65) Prior Publication Data

US 2015/0034770 A1 Feb. 5, 2015

Related U.S. Application Data

(62) Division of application No. 13/186,847, filed on Jul. 20, 2011, now abandoned.

(51) Int. Cl.
*B64G 1/52* (2006.01)
*B64G 1/00* (2006.01)
*B64G 1/12* (2006.01)
*B64G 1/64* (2006.01)

(52) U.S. Cl.
CPC ............... *B64G 1/52* (2013.01); *B64G 1/002* (2013.01); *B64G 1/12* (2013.01); *B64G 1/641* (2013.01); *B64G 2001/525* (2013.01)

(58) Field of Classification Search
CPC .......... B64G 1/002; B64G 1/005; B64G 1/40; B64G 1/52; B64G 1/641; B64G 1/645
See application file for complete search history.

(56) References Cited

U.S. PATENT DOCUMENTS

| 3,001,739 | A | | 9/1961 | Faget et al. | |
|---|---|---|---|---|---|
| 5,816,539 | A | | 10/1998 | Chan et al. | |
| 6,296,206 | B1 | * | 10/2001 | Chamness | B64G 1/00 244/173.3 |
| 6,793,183 | B1 | * | 9/2004 | Hand | B64G 1/641 244/158.1 |
| 7,484,692 | B1 | * | 2/2009 | McKinney | B64G 1/002 244/158.9 |

FOREIGN PATENT DOCUMENTS

NL      EP 0381869 A1 * 8/1990 ............. B64G 1/641

* cited by examiner

*Primary Examiner* — Nicholas McFall
(74) *Attorney, Agent, or Firm* — Vista IP Law Group LLP; Cynthia A. Dixon

(57) ABSTRACT

A system, method, and apparatus for a vented launch vehicle adaptor (LVA) for a manned spacecraft with a "pusher" launch abort system are disclosed. The disclosed LVA provides a structural interface between a commercial crew vehicle (CCV) crew module/service module (CM/SM) spacecraft and an expendable launch vehicle. The LVA provides structural attachment of the module to the launch vehicle. It also provides a means to control the exhaust plume from a pusher-type launch abort system that is integrated into the module. In case of an on-pad or ascent abort, which requires the module to jettison away from the launch vehicle, the launch abort system exhaust plume must be safely directed away from critical and dangerous portions of the launch vehicle in order to achieve a safe and successful jettison.

9 Claims, 8 Drawing Sheets

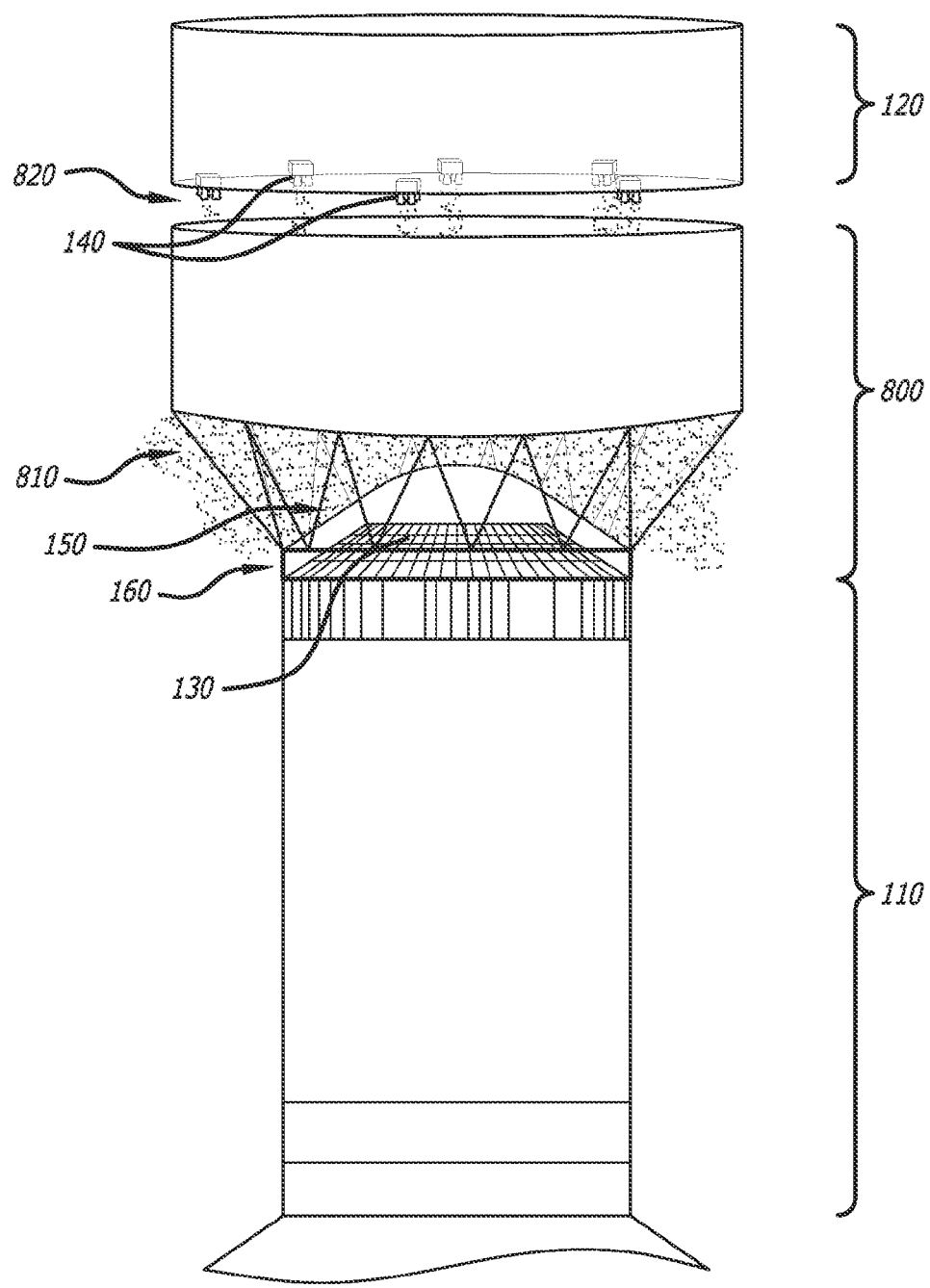

VENTED LAUNCH VEHICLE ADAPTOR FOR A MANNED SPACECRAFT WITH "PUSHER" LAUNCH ABORT SYSTEM

CROSS-REFERENCE TO RELATED APPLICATION

This application is a Divisional application of, and claims the benefit of, U.S. patent application Ser. No. 13/186,847, filed Jul. 20, 2011, which is hereby incorporated by reference in its entirety.

GOVERNMENT LICENSE RIGHTS

This disclosure was made with Government support under contract number NNJ10TA07S awarded by NASA. The U.S. Government has certain rights in this invention.

BACKGROUND

The present disclosure relates to launch vehicle adaptors. In particular, it relates to vented launch vehicle adaptors for manned spacecraft with a "pusher" launch abort system (LAS).

SUMMARY

The present disclosure relates to a system, method, and apparatus for a vented launch vehicle adaptor (LVA) for a manned spacecraft with a "pusher" launch abort system (LAS). In particular, the disclosed launch abort system involves a launch vehicle adaptor, a module, a launch vehicle, and at least one launch abort system thruster. In one or more embodiments, an end of the module is connected to an end of the launch vehicle adaptor. In at least one embodiment, an end of the launch vehicle is connected to an end of the launch vehicle adaptor that is opposite the end of the launch vehicle adaptor that is connected to the module. In some embodiments, at least one launch abort system thruster is configured to produce thrust in a direction away from the launch vehicle.

In one or more embodiments, the module is a crew module and/or a service module. In some embodiments, the end of the launch vehicle is connected to the end of the launch vehicle adaptor via an adaptor ring. In at least one embodiment, the adaptor ring is a machined ring, a cast ring, or a composite ring.

In at least one embodiment, the launch vehicle adaptor is a cylindrical shape or a conic shape. In some embodiments, the end of the launch vehicle adaptor that is connected to the end of the launch vehicle includes an open truss, which allows for exhaust produced by at least one launch abort system thruster to escape from the launch vehicle adaptor.

In one or more embodiments, the launch vehicle adaptor includes at least one opening, which allows for exhaust produced by at least one launch abort system thruster to escape from the launch vehicle adaptor. In some embodiments, the launch vehicle adaptor includes at least one blow-out door cover that covers at least one opening. In at least one embodiment, the launch vehicle adaptor includes at least one hinged door cover that covers at least one opening.

In at least one embodiment, at least one launch abort system thruster is mounted on an interior of the launch vehicle adaptor. In some embodiments, the thrust produced by at least one launch abort system thruster allows for the launch vehicle adaptor to separate from the launch vehicle.

In one or more embodiments, at least one launch abort system thruster is mounted on an interior of the service module. In some embodiments, the thrust produced by at least one launch abort system thruster allows for the service module to separate from the launch vehicle adaptor.

In at least one embodiment, a launch vehicle adaptor includes a housing for the launch vehicle adaptor, and at least one launch abort system thruster. In some embodiments, at least one launch abort system thruster is mounted on an interior of the housing, and is configured to produce thrust.

In one or more embodiments, an end of the housing includes an open truss, which allows for exhaust produced by at least one launch abort system thruster to escape from the housing. In some embodiments, the housing is a cylindrical shape or a conic shape. In at least one embodiment, the housing includes at least one opening, which allows for exhaust produced by at least one launch abort system thruster to escape from the housing. In one or more embodiments, the housing includes at least one blow-out door cover that covers at least one opening. In some embodiments, the housing includes at least one hinged door cover that covers at least one opening. In at least one embodiment, an end of the housing includes an adaptor ring, where the adaptor ring is a machined ring, a cast ring, or a composite ring.

In at least one embodiment, a launch vehicle adaptor includes a housing for the launch vehicle adaptor. In one or more embodiments, the housing includes at least one opening, which allows for exhaust to escape from the housing.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 8 shows a diagram of a LVA that has an open truss, has a cylindrical shape, and separates from the service module, in accordance with at least one embodiment of the present disclosure.

DESCRIPTION

Figure 1:
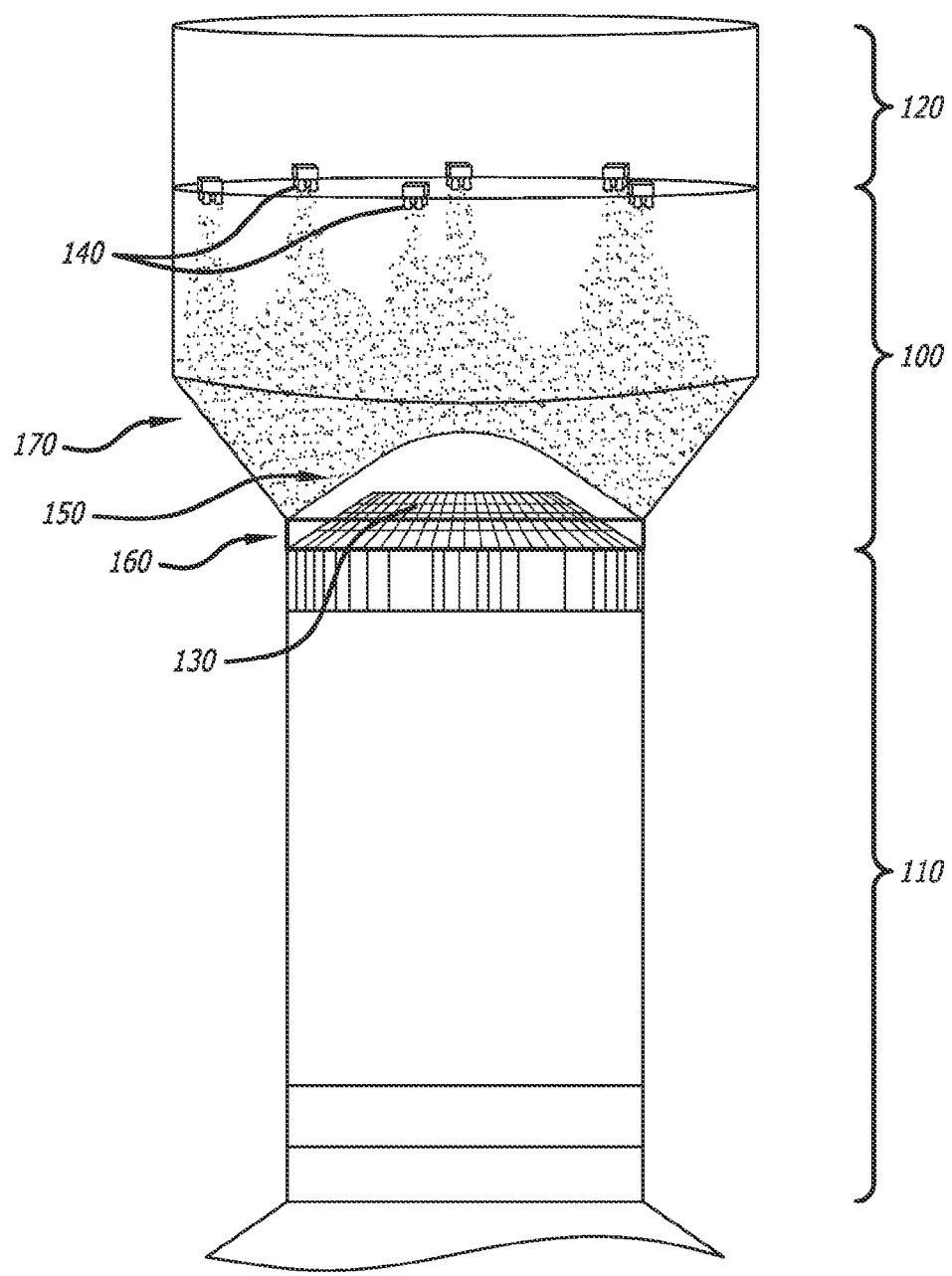
FIG. 1 shows a diagram of a launch vehicle adaptor (LVA) that is closed and has a cylindrical shape, in accordance with at least one embodiment of the present disclosure.

The methods and apparatus disclosed herein provide an operative system for launch vehicle adaptors. Specifically, this system relates to vented launch vehicle adaptors for a manned spacecraft with a "pusher" launch abort system (LAS). In particular, the disclosed launch vehicle adapter (LVA) provides a structural interface between a commercial crew vehicle (CCV) crew module/service module (CM/SM) spacecraft and an expendable launch vehicle. The launch vehicle adaptor also provides structural attachment of the spacecraft to the launch vehicle. In addition, it provides a means to control the exhaust plume from a pusher-type launch abort system, which is integrated into the service module. In case of an on-pad or ascent abort, which requires the spacecraft to jettison from the launch vehicle, the launch abort system plume must be safely directed away from critical and dangerous portions of the launch vehicle in order to achieve a successful jettison.

The disclosed launch vehicle adaptor solves the problem of blast plume overpressure from within the confined space of the launch vehicle adapter during an emergency abort of a manned or unmanned spacecraft from atop the launch vehicle. If the pressure were to remain contained within this space, the requisite functionality of the launch vehicle to perform certain abort and destruct functions would likely be compromised. In addition, the rebound of the exhaust gasses from within the launch vehicle adapter could damage the spacecraft prior to complete separation from the launch vehicle.

Previous launch abort systems utilized a tractor-type tower mounted atop the crew module to house the launch abort system engines, which are used for jettisoning the crewed module. These types of systems were used to "pull" the crewed module to safety from atop the launch vehicle. Tractor-type launch abort systems were used in the Mercury and Apollo programs, and were to be used for the Orion/Ares configuration.

When the launch abort system is a "pusher" system, the exhaust plume and pressure built up from the exhaust plume within the launch vehicle adaptor must be released or the launch vehicle adaptor and/or the forward end of the rocket below the launch vehicle adaptor will fail. This failure may compromise the launch vehicle, and may lead to the preliminary destruction of the launch vehicle, which will impact the safety of the crew during the abort.

The disclosed pusher-type launch abort system is beneficial because any unused launch abort system propellants may be used to re-boost space stations, such as The International Space Station, back into higher orbits. This disclosed system also has the advantage of lowering the center of gravity of the payload, and may be manufactured to be lighter than a tower tractor-type launch abort system.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 shows a diagram of a launch vehicle adaptor (LVA) 100 that is closed 170 and has a cylindrical shape, in accordance with at least one embodiment of the present disclosure. In this figure, one end of the launch vehicle adaptor 100 is shown to be connected to the forward end 130 of an upper stage of a launch vehicle 110. The other end of the launch vehicle adaptor 100 is shown to be connected to one end of a module 120. The module 120 may be a crew module and/or a service module.

The forward end 130 of the upper stage of the launch vehicle 110 may include avionics as well as a fuel tank dome. An ejection/exhaust (E/E) blast cover 150 may be attached to the end of the launch vehicle adaptor 100 that is connected to the forward end 130 of the launch vehicle 110. The E/E blast cover 150 is used to protect the launch vehicle 110 from the exhaust plumes produced by the launch abort system thrusters 140 during an abort of the module 120. These plumes consist of very sharp, concise jets of superheated exhaust.

Multiple launch abort system thrusters 140 are shown to be mounted on the interior of the service module 120. It should be noted that in other embodiments, the launch abort system thrusters 140 may be mounted on the interior of the launch vehicle adaptor 100 itself.

In this figure, the launch vehicle adaptor 100 housing is constructed to be of a cylindrical shape. In alternative embodiments, the launch vehicle adaptor 100 housing may be manufactured to be of various other types of shapes. In addition, the launch vehicle adaptor 100 housing includes a machined adaptor ring 160, which is used to connect the launch vehicle adaptor 100 to the launch vehicle 110. It should be noted that this particular launch vehicle adaptor 100 housing has a solid wall 170 with no openings. Since there are no openings in this launch vehicle adaptor 100 housing, pressure from exhaust produced by the launch abort system thrusters 140 may build up inside of the launch vehicle adaptor 100 when the exhaust gases expand.

During operation of the disclosed "pusher" launch abort system, when an abort is initiated, the launch abort thrusters 140 are commanded to produce thrust. The launch abort system thrusters 140 generate a force in a direction away from the launch vehicle 110. This thrust causes the launch vehicle adaptor 100 to separate from the launch vehicle 110. The thrust also causes the launch vehicle adaptor 100 and the module 120 to be jettisoned together away from the launch vehicle 110. In alternative embodiments, the thrust may cause the service module 120 to separate and be jettisoned away from the launch vehicle adaptor 100, which will remain connected to the launch vehicle 110.

Figure 2:
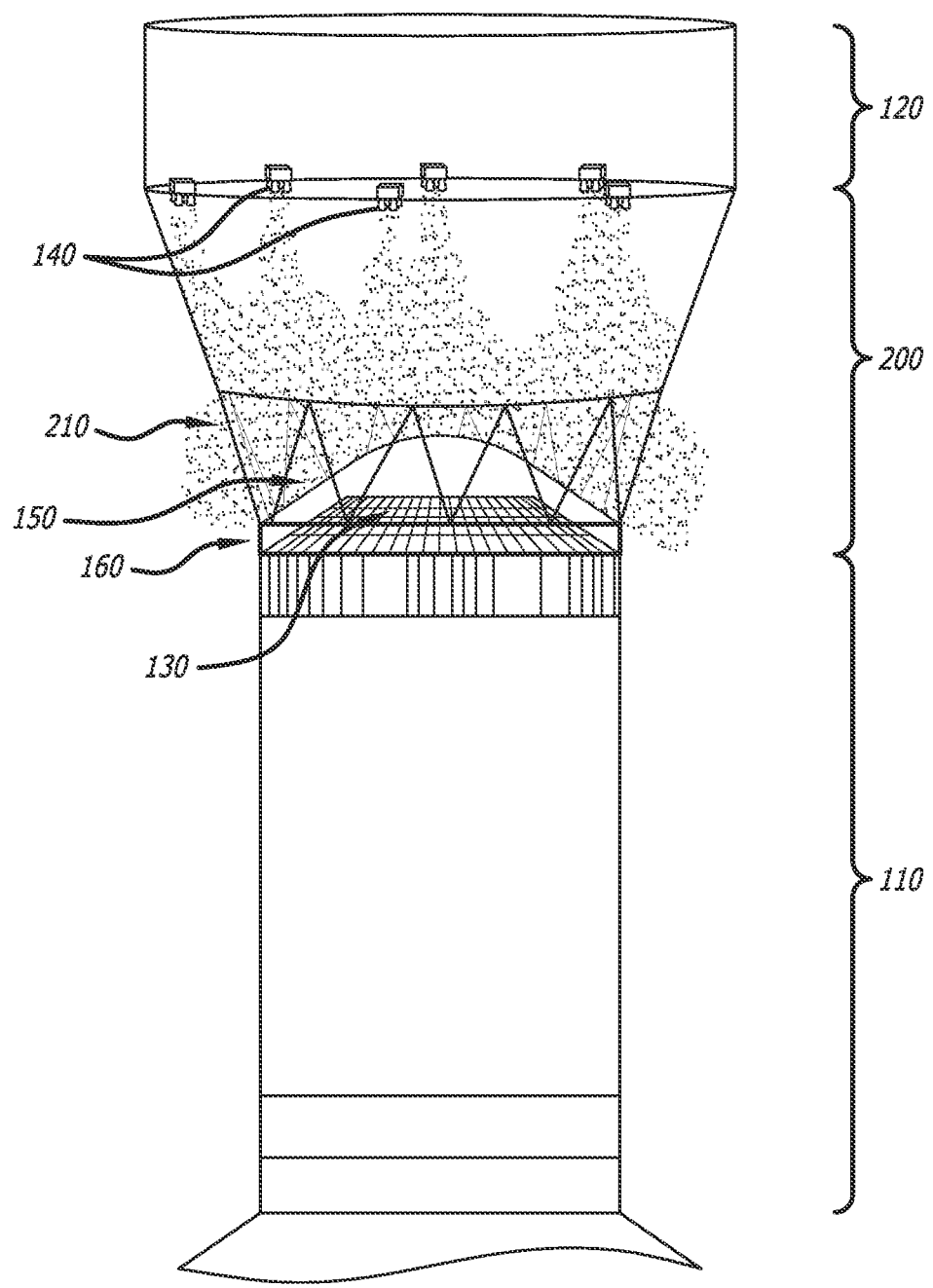
FIG. 2 shows a diagram of a LVA that has an open truss and has a conic shape, in accordance with at least one embodiment of the present disclosure.

FIG. 2 shows a diagram of a LVA 200 that has an open truss 210 and has a conic shape, in accordance with at least one embodiment of the present disclosure. In this figure, the launch vehicle adaptor 200 is shown to have a housing that is constructed to be of a conic shape. In addition, one end of the launch vehicle adaptor 200 includes a network of open struts 210 (interchangeably referred to herein as open truss or open truss structure). The open struts 210 allow for the exhaust produced from the launch abort system thrusters 140 to escape from the inside of the launch vehicle adaptor 200. At the base of the open struts 210 is a machined adaptor ring 160. This ring 160 is used to connect the launch vehicle adaptor 200 to the forward end 130 of the launch vehicle 110.

It should be noted that the open truss structure 210 as well as the conic shell structure housing of the launch vehicle adaptor 200 may be constructed from a metallic or composite material or any combination thereof. The open truss structure 210 allows for venting of the launch abort system thruster 140 exhaust plumes either directly out of the launch vehicle adaptor 200 or with little rebound. In some examples, maintaining short lengths for the trusses 210 keeps the truss structure strength high and the mass low, which is critical for carrying large loads above it on the rocket. A protective shield 150 (interchangeably referred to herein as blast cover or blast shield) may optionally be installed inside the launch vehicle adaptor 200 to further protect the forward end 130 of the launch vehicle upper stage 110. This blast cover 150 may be manufactured from either a metallic or composite material or a combination thereof. The blast cover 150 is used to redirect any errant flow of the exhaust plume laterally away from the launch vehicle's 110 forward end 130. In some embodiments, the blast shield 150 may be covered with an ablative insulation, as required.

Figure 3:
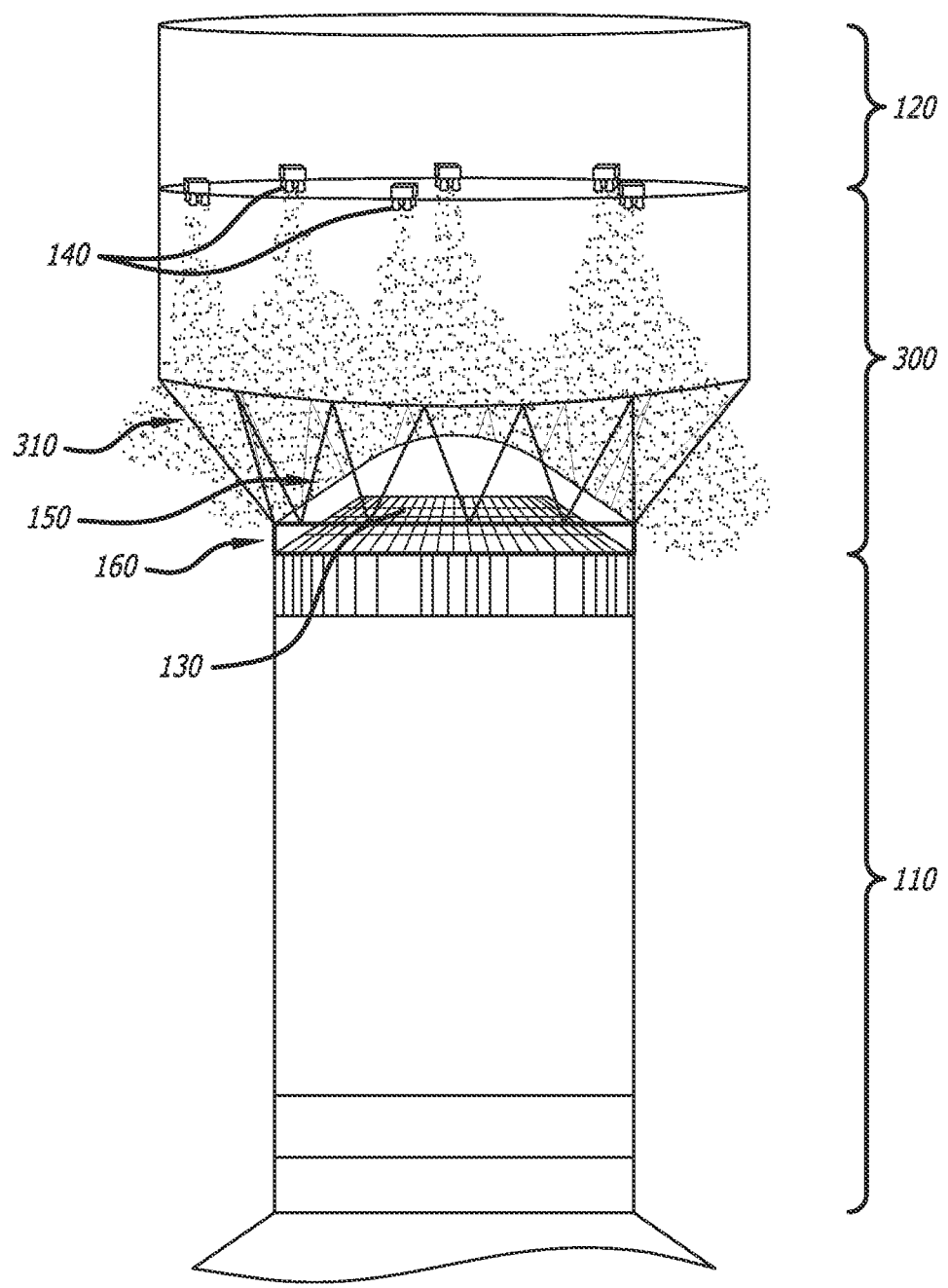
FIG. 3 shows a diagram of a LVA that has an open truss and has a cylindrical shape, in accordance with at least one embodiment of the present disclosure.

FIG. 3 shows a diagram of a LVA 300 that has an open truss 310 and has a cylindrical shape, in accordance with at least one embodiment of the present disclosure. The launch vehicle adaptor 300 in this figure is the same and operates the same as the launch vehicle adaptor 200 in FIG. 2, except that the launch vehicle adaptor 300 in this figure is constructed to be of a cylindrical shape, rather than a conic shape as the launch vehicle adaptor 200 of FIG. 2.

Figure 4:
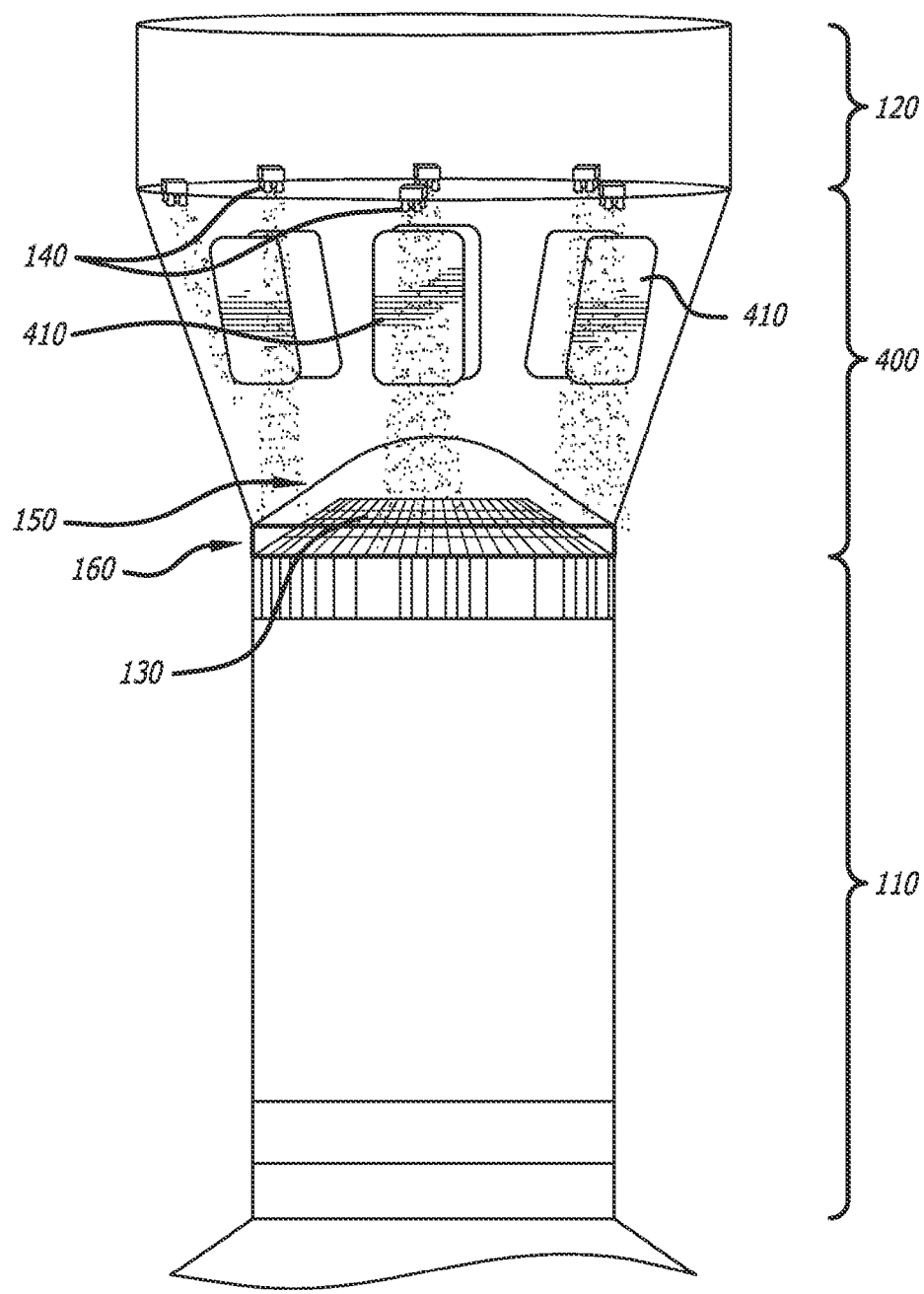
FIG. 4 shows a diagram of a LVA that has blow-out door covers and has a conic shape, in accordance with at least one embodiment of the present disclosure.

FIG. 4 shows a diagram of a LVA 400 that has blow-out door covers 410 and has a conic shape, in accordance with at least one embodiment of the present disclosure. In this figure, the blow-out door covers (or blast panels) 410, while not structural, serve the purpose of keeping ascent pressure, dust, and debris out of the launch vehicle adaptor 400. In the case of an emergency abort, these blow-out door covers 410 may be passively or actively ejected from the launch vehicle adaptor 400 in order to keep the majority of launch abort system thruster 140 exhaust plume away from the launch vehicle 110 forward end 130. Additionally, with the panels 410 blown out, the pressure build-up from the exhaust plumes will vent to the exterior of the launch vehicle adaptor 400, thereby reducing stress on the launch vehicle's 110 avionics and forward tank dome.

Figure 5:
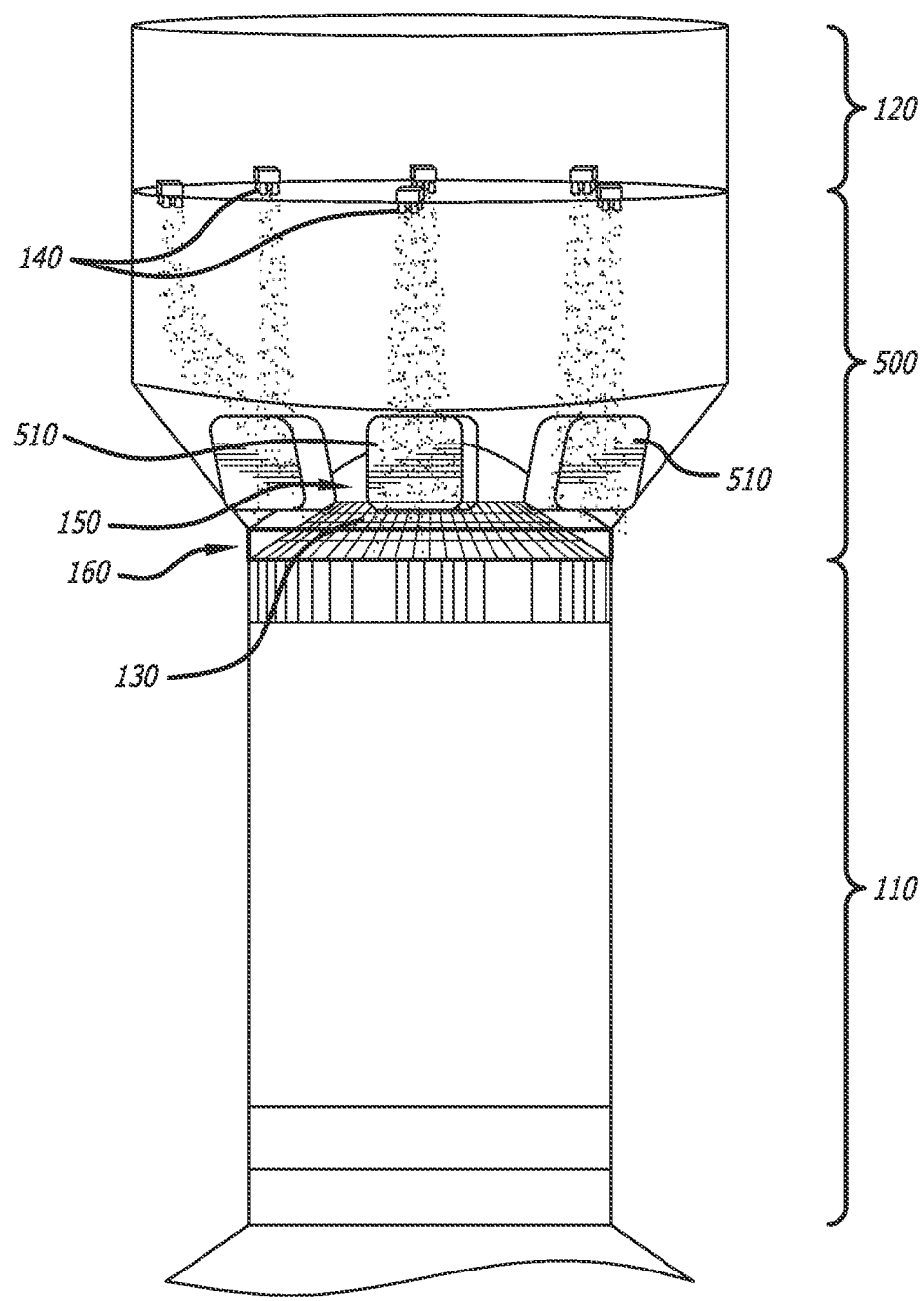
FIG. 5 shows a diagram of a LVA that has blow-out door covers and has a cylindrical shape, in accordance with at least one embodiment of the present disclosure.

FIG. 5 shows a diagram of a LVA 500 that has blow-out door covers 510 and has a cylindrical shape, in accordance with at least one embodiment of the present disclosure. The launch vehicle adaptor 500 in this figure is the same and operates the same as the launch vehicle adaptor 400 in FIG. 4, except that the launch vehicle adaptor 500 in this figure is constructed to be of a cylindrical shape, rather than a conic shape as the launch vehicle adaptor 400 of FIG. 4.

Figure 6:
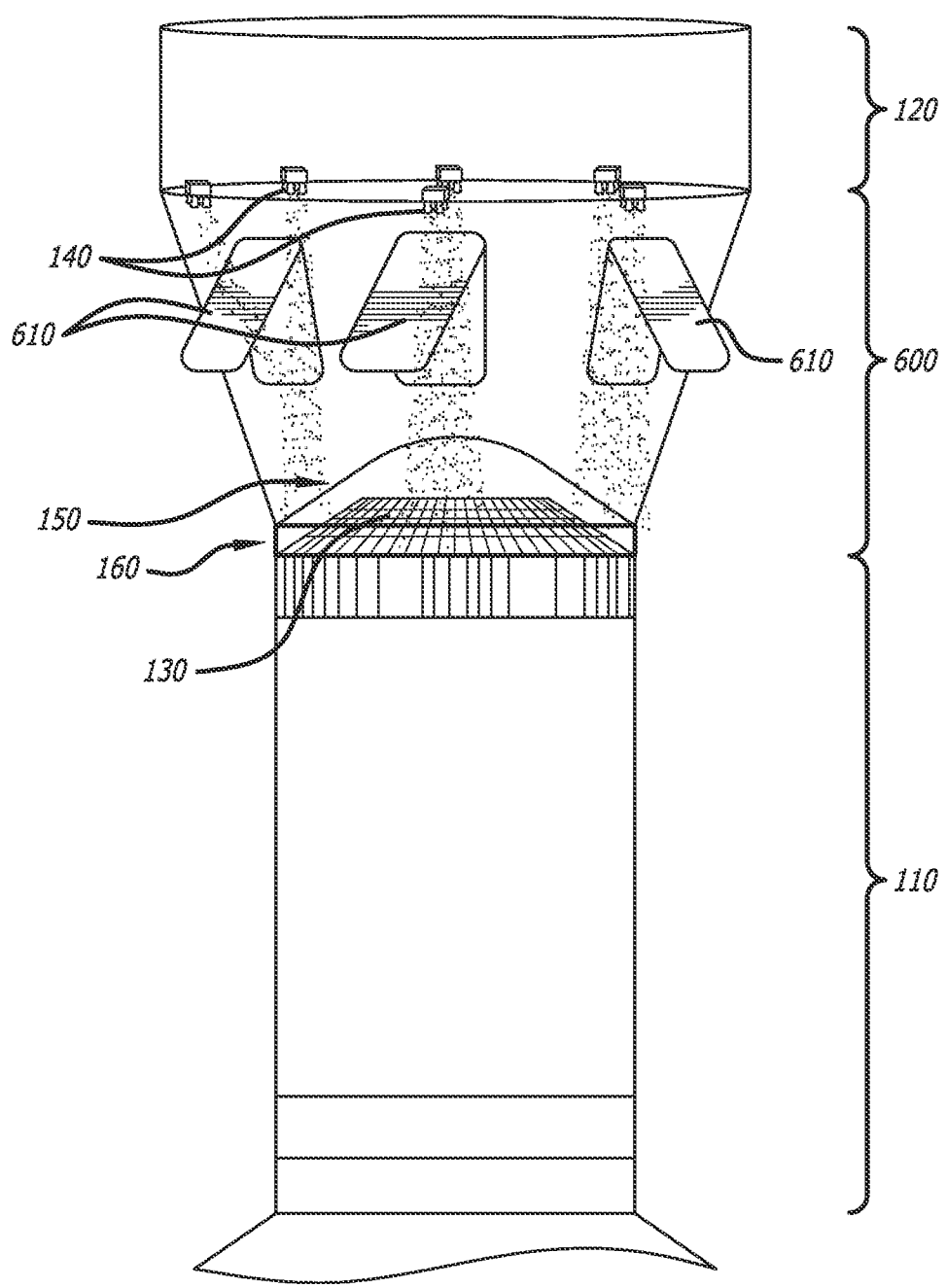
FIG. 6 shows a diagram of a LVA that has hinged door covers and has a conic shape, in accordance with at least one embodiment of the present disclosure.

FIG. 6 shows a diagram of a LVA 600 that has hinged door covers 610 and has a conic shape, in accordance with at least one embodiment of the present disclosure. In this figure, hinged door covers (or hinged panels) 610, similar to the blow-out door covers 410, 510 depicted in FIGS. 4 and 5, serve the purpose of keeping ascent pressure, dust, and debris out of the launch vehicle adaptor 600. When the hinged door covers 610 are opened, the pressure build-up from the exhaust plumes will vent to the exterior of the launch vehicle adaptor 600 and, thus, the stress on the launch vehicle's 110 avionics and forward tank dome will be reduced.

Figure 7:
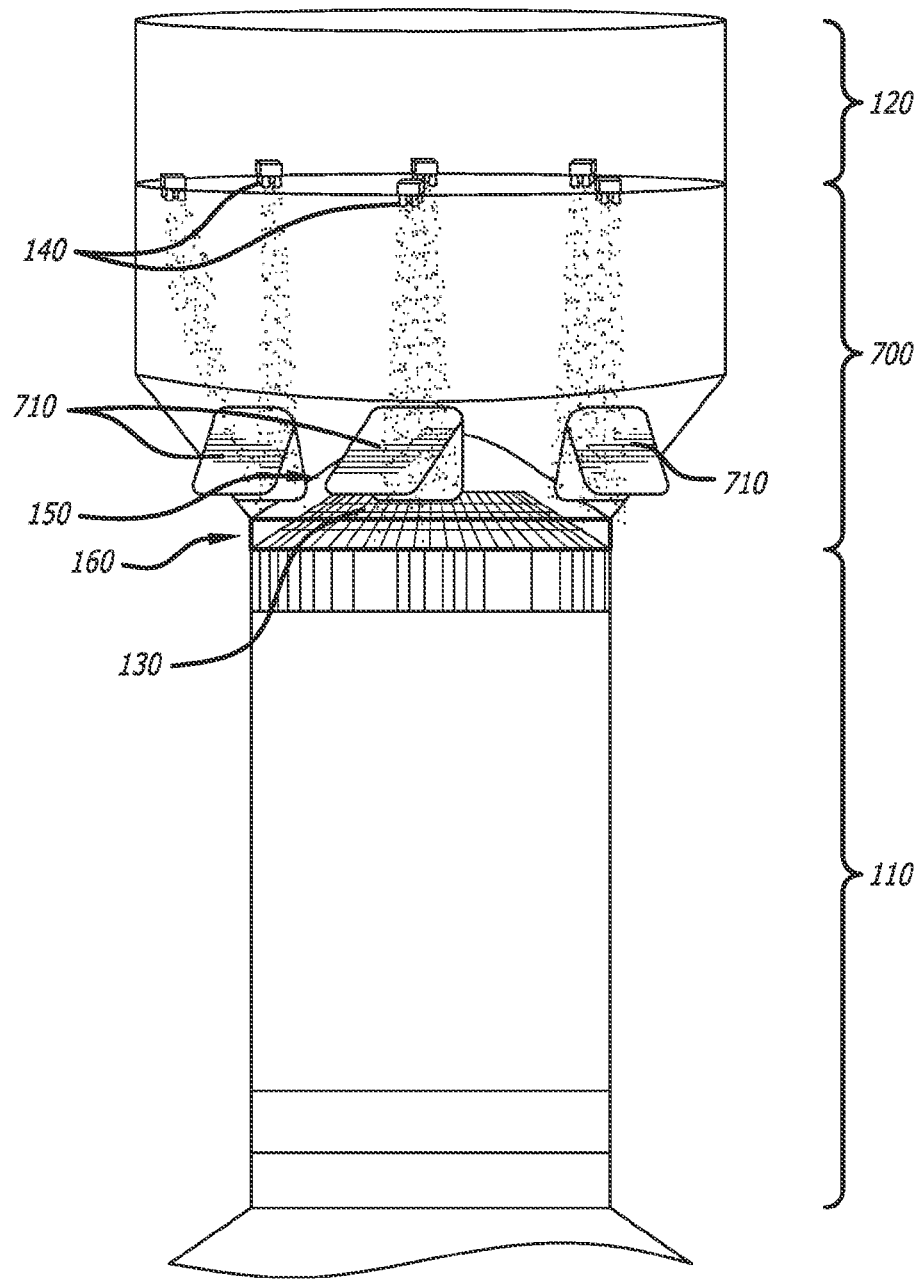
FIG. 7 shows a diagram of a LVA that has hinged door covers and has a cylindrical shape, in accordance with at least one embodiment of the present disclosure.

FIG. 7 shows a diagram of a LVA 700 that has hinged door covers 710 and has a cylindrical shape, in accordance with at least one embodiment of the present disclosure. The launch vehicle adaptor 700 in this figure is the same and operates the same as the launch vehicle adaptor 600 in FIG. 6, except that the launch vehicle adaptor 700 in this figure is constructed to be of a cylindrical shape, rather than a conic shape as the launch vehicle adaptor 600 of FIG. 6.

FIG. 8 shows a diagram of a LVA 800 that has an open truss 810, has a cylindrical shape, and separates from the service module 120, in accordance with at least one embodiment of the present disclosure. This figure depicts the separation of the module 120 from the launch adaptor ring 800 after an abort has been initiated. After an emergency abort has been initiated, the launch abort system thrusters 140 will generate sharp exhaust plumes, and the separation will be rapid. The open truss 810 will allow for some of the pressure build up of the exhaust to escape from the launch vehicle adaptor 800. In addition, during separation, some of the pressure from the exhaust will be relieved by the opening 820 that is created from the separation of the module 120 and the launch vehicle adaptor 800.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A launch abort system (LAS), the system comprising:
    a launch vehicle adaptor;
    a module connected to a first end of the launch vehicle adaptor;
    a launch vehicle connected to a second end of the launch vehicle adaptor that is opposite the first end; and
    at least one launch abort system thruster configured to produce thrust in a direction away from the launch vehicle,
    wherein the at least one launch abort system thruster is mounted on an interior of the launch vehicle adaptor, and
    wherein the launch vehicle adaptor includes at least one opening, which allows for exhaust produced by the at least one launch abort system thruster to escape from the launch vehicle adaptor.

2. The system of claim 1, wherein the module is at least one of a crew module and a service module.

3. The system of claim 1, wherein the launch vehicle is connected to the second end of the launch vehicle adaptor via an adaptor ring.

4. The system of claim 3, wherein the adaptor ring is one of a machined ring, a cast ring, and a composite ring.

5. The system of claim 1, wherein the launch vehicle adaptor is a conic shape.

6. The system of claim 1, wherein the second end of the launch vehicle adaptor includes an open truss structure to allow for exhaust produced by the at least one launch abort system thruster to escape from the launch vehicle adaptor.

7. The system of claim 1, wherein the launch vehicle adaptor includes at least one blow-out door cover that covers the at least one opening.

8. The system of claim 1, wherein the launch vehicle adaptor includes at least one hinged door cover that covers the at least one opening.

9. The launch abort system of claim 1, further comprising a blast cover proximate the second end of the launch vehicle adaptor.

* * * * *

UNITED STATES PATENT AND TRADEMARK OFFICE
CERTIFICATE OF CORRECTION

PATENT NO. : 9,758,262 B2
APPLICATION NO. : 14/338040
DATED : September 12, 2017
INVENTOR(S) : Robert E. Vandervort Page 1 of 1

It is certified that error appears in the above-identified patent and that said Letters Patent is hereby corrected as shown below:

In the Claims

In Claim 2, Column 6, Line 39, change "crew module and a service module" to --crew module or a service module--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*